(12) United States Patent
Tyrberg et al.

(10) Patent No.: US 11,232,886 B2
(45) Date of Patent: Jan. 25, 2022

(54) REINFORCED SUBMARINE POWER CABLE

(71) Applicant: NKT HV Cables AB, Lyckeby (SE)

(72) Inventors: Andreas Tyrberg, Lyckeby (SE); Krister Nordlund, Karlskrona (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 16/659,097

(22) Filed: Oct. 21, 2019

(65) Prior Publication Data

US 2020/0135361 A1 Apr. 30, 2020

(30) Foreign Application Priority Data

Oct. 26, 2018 (EP) .................................... 18202837

(51) Int. Cl.
| | |
|---|---|
| *H01B 7/14* | (2006.01) |
| *H01B 7/22* | (2006.01) |
| *H01B 7/282* | (2006.01) |
| *H01B 13/06* | (2006.01) |
| *H01B 13/22* | (2006.01) |
| *H02G 1/10* | (2006.01) |
| *H02G 9/02* | (2006.01) |

(52) U.S. Cl.
CPC ............... *H01B 7/14* (2013.01); *H01B 7/225* (2013.01); *H01B 7/226* (2013.01); *H01B 7/282* (2013.01); *H01B 13/06* (2013.01); *H01B 13/22* (2013.01); *H02G 1/10* (2013.01); *H02G 9/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 528,291 | A | * | 10/1894 | Cummings ............. F16L 59/16 285/47 |
| 1,946,190 | A | * | 2/1934 | Brodhun ................ H01B 7/226 174/105 R |
| 2,209,743 | A | * | 7/1940 | Xenis ...................... H01B 3/28 156/53 |

(Continued)

FOREIGN PATENT DOCUMENTS

| | | |
|---|---|---|
| EP | 0450271 A2 | 10/1991 |
| WO | 0221654 A1 | 3/2002 |

OTHER PUBLICATIONS

Extended European Search Report Application No. 18202837.3 Completed: Mar. 12, 2019; dated Mar. 19, 2019 8 Pages.

(Continued)

*Primary Examiner* — William H. Mayo, III
*Assistant Examiner* — Krystal Robinson
(74) *Attorney, Agent, or Firm* — Whitmyer IP Group LLC

(57) ABSTRACT

A submarine power cable having: a power core including a conductor, wherein the conductor has a conductor joint in a joint region of the power core, a main armor layer including a plurality of main armor wires arranged around the power core and extending in the axial direction of the power core, and a joint reinforcement armor layer including a plurality of joint reinforcement armor wires axially locked relative to the main armor wires, wherein the joint reinforcement armor layer is provided only in the joint region and arranged layered with the main armor layer, the joint reinforcement armor layer and the main armor layer thereby forming a dual-layer armor only in the joint region.

14 Claims, 2 Drawing Sheets

(56) References Cited

U.S. PATENT DOCUMENTS

| | | | | |
|---|---|---|---|---|
| 2,287,163 | A * | 6/1942 | Bishop | H02G 15/14 156/49 |
| 2,429,889 | A * | 10/1947 | Morrison | H02G 15/115 174/84 R |
| 2,435,284 | A * | 2/1948 | Josephe | H02G 15/10 174/84 R |
| 2,462,977 | A * | 3/1949 | Kitchin | H02G 15/003 174/84 R |
| 2,894,057 | A * | 7/1959 | Meyers | H02G 15/14 174/108 |
| 2,908,744 | A * | 10/1959 | Bollmeier | H02G 15/113 174/76 |
| 2,930,835 | A * | 3/1960 | Bollmeier | H02G 15/24 174/76 |
| 2,967,795 | A * | 1/1961 | Bollmeier | H02G 15/003 174/84 R |
| 3,515,798 | A * | 6/1970 | Sievert | F16B 4/004 174/135 |
| 3,592,958 | A * | 7/1971 | Munn | H02G 15/14 174/88 R |
| 4,639,546 | A * | 1/1987 | Meltsch | H02G 15/1806 156/49 |
| 4,670,980 | A * | 6/1987 | Charlebois | H02G 15/013 156/49 |
| 4,685,981 | A * | 8/1987 | Dienes | H02G 15/003 156/48 |
| 5,203,721 | A * | 4/1993 | Buck | H01R 9/0509 439/581 |
| 5,802,715 | A * | 9/1998 | O'Neill | H02G 15/007 156/49 |
| 5,817,979 | A * | 10/1998 | O'Neill | H02G 15/117 174/84 C |
| 5,914,371 | A * | 6/1999 | Mueller | C08L 9/00 525/191 |
| 6,103,975 | A * | 8/2000 | Krabs | H02G 15/103 174/74 A |
| 7,323,640 | B2 * | 1/2008 | Takahashi | H01B 11/002 174/106 R |
| 9,922,751 | B2 * | 3/2018 | Zhang | H01B 11/20 |
| 10,395,793 | B2 * | 8/2019 | Satou | H01R 43/0207 |
| 2002/0040803 | A1 * | 4/2002 | Buyst | H02G 15/188 174/88 R |
| 2011/0253415 | A1 * | 10/2011 | Muschiatti | H01B 11/1821 174/107 |
| 2014/0367164 | A1 * | 12/2014 | Zettervall | H01B 7/1875 174/88 R |
| 2021/0013707 | A1 * | 1/2021 | Santoro | H02G 3/0675 |

OTHER PUBLICATIONS

European Office Action; Application No. 18 202 837.3; dated Nov. 18, 2020; 7 Pages.
European Office Action; Application No. 18 202 837.3; dated Mar. 19, 2021; 7 Pages.

* cited by examiner

REINFORCED SUBMARINE POWER CABLE

TECHNICAL FIELD

The present disclosure generally relates to armoured submarine power cables.

BACKGROUND

Submarine power cables are subjected to tensional forces during installation. The tensional forces arise due to the weight of the submarine power cable. Tensional forces also arise due to the dynamic forces from vertical movement of the vessel carrying out the installation, because of sea motion. Submarine power cables therefore normally have an armoring. The armor typically comprises a plurality of metal wires which are wound helically around the one or more power cores. The armor provides tension stability. Moreover, the armor also provides mechanical protection of the submarine power cable from for example installation tools and objects in the sea such as anchors.

The armoring may comprise one or more layers of armor wires. The number of armor layers used depends on for example the cable size and/or installation depth. Single layer armored cables are typically used for moderate water depths. Advantages of single layered armored cables compared to double layer armor cables are that they are less heavy and have a lower price. Double layer armor however provides a much better mechanical protection against external force than single layer armor. In the case of double layer armor, the wires of the two layers may be laid counter-helically. As a result, the torsional forces of the two layers counterbalance or can even cancel each other out. Since single layer armored cables are not torsionally balanced, a higher load will be transferred to the conductor. In a double layer armored cable approximately 10-20% of the load is taken by the conductor(s), whilst in a single layer armored cable 60-80% of the load is normally taken by the conductor(s).

SUMMARY

The mechanically weakest parts of a submarine power cable are the conductor joints. The strength of the joints therefore set the limit with regards to the maximum allowed tension on the cable.

In view of the above, a general object of the present disclosure is to provide a submarine power cable which solves or at least mitigates problems of the prior art.

There is hence according to a first aspect of the present disclosure provided a submarine power cable comprising: a power core including a conductor, wherein the conductor has a conductor joint in a joint region of the power core, a main armor layer comprising a plurality of main armor wires arranged around the power core and extending in the axial direction of the power core, and a joint reinforcement armor layer comprising a plurality of joint reinforcement armor wires axially locked relative to the main armor wires, wherein the joint reinforcement armor layer is provided only in the joint region and arranged layered with the main armor layer, the joint reinforcement armor layer and the main armor layer thereby forming a dual-layer armor only in the joint region.

By providing a second armor layer only in the joint region, the submarine power cable will be lighter and cheaper than a corresponding double layer armored cable. Moreover, since it includes less armoring than a double layer armored cable, the present submarine power cable has a smaller environmental footprint. The strength of the submarine power cable is however significantly increased compared to a single layer armored cable. In particular, the strength of the submarine power cable is locally increased around the conductor joint and reduces the load onto the conductor joint. The maximum allowed tension of the submarine power cable can thereby be increased, and hence the installation depth can be increased.

The dual-layer armor is provided over and extends axially across the conductor joint. The dual-layer armor hence extends axially from one side of the conductor joint to the other side of the conductor joint.

The joint region has a limited extension in both axial directions from the conductor joint relative to the total length of the submarine power cable. The joint region has a substantially shorter axial extension than the length of the entire submarine power cable.

The majority of the length of the submarine power cable preferably only has the main armor layer as armoring. Hence, preferably, the majority of the length of the submarine power cable only has a single armor layer, i.e. the main armor layer.

One embodiment comprises a first metal ring arranged around the power core at an axial distance from the conductor joint in a first axial direction of the conductor, wherein a first axial end portion of each of the plurality of joint reinforcement armor wires, and the main armor wires are connected to the first metal ring.

The first metal ring may be made of the same material as the joint reinforcement armor wires and the main armor wires. The first metal ring may for example comprise steel, such as stainless steel or galvanized steel.

According to one example, the submarine power cable comprises a first metal ring and the joint reinforcement armor wires are welded only to the first metal ring. The submarine power cable is furthermore provided with a first radial stop structure configured to prevent axial sliding of the first metal ring. The first radial stop structure may be a radial protrusion extending peripherally around the main armor layer, for example created by layers of tape. The first metal ring is in this example hence not welded to the main armor wires.

According to one example, a first axial end portion of the individual joint reinforcement armor wires are welded directly to the main armor layer, in particular to main armor wires.

According to one example, submarine power cable comprises a first friction member, wherein a first end portion of the joint reinforcement armor wires are axially locked relative to the main armor wires by means of the first friction member arranged around the joint reinforcement armor wires. The first friction member may be configured to apply a radially inwards directed pressure onto the joint reinforcement armor layer and the main armor layer. The first friction member may for example be a rope or tape.

According to one embodiment the joint reinforcement armor wires and the main armor wires are welded to the first metal ring.

One embodiment comprises a second metal ring arranged around the power core at an axial distance from the conductor joint in a second axial direction of the conductor, the second axial direction being opposite to the first axial direction, wherein a second axial end portion of each of the plurality of joint reinforcement armor wires, and the main armor wires are connected to the second metal ring.

The second metal ring may be made of the same material as the joint reinforcement armor wires and the main armor wires. The second metal ring may for example comprise steel, such as stainless steel or galvanized steel.

According to one example, the submarine power cable comprises a second metal ring and the joint reinforcement armor wires are welded only to the second metal ring. The submarine power cable is provided with a second radial stop structure configured to prevent axial sliding of the second metal ring. The second radial stop structure may be a radial protrusion extending peripherally around the main armor layer, for example created by layers of tape. The second metal ring is in this example hence not welded to the main armor wires.

According to one example, a second axial end portion of the individual joint reinforcement armor wires are welded directly to the main armor layer, in particular to main armor wires.

According to one example, submarine power cable comprises a second friction member, wherein a second end portion of the joint reinforcement armor wires are axially locked relative to the main armor wires by means of the second friction member arranged around the joint reinforcement armor wires. The second friction member may be configured to apply a radially inwards directed pressure onto the joint reinforcement armor layer and the main armor layer. The second friction member may for example be a rope or tape.

The joint region may be the axially extending region delimited by the first metal ring and the second metal ring.

According to one embodiment the joint reinforcement armor wires and the main armor wires are welded to the second metal ring.

According to one embodiment the joint reinforcement armor wires are arranged radially outside of the main armor layer.

According to one embodiment the joint reinforcement armor wires extend at least 2 meters, such as at least 3 meters, at least 4 meters or at least 5 meters, in both axial directions from the conductor joint. The joint region, which may be centered on the conductor joint and which may be symmetric, hence has a length of at least 4 meters, such as at least 6 meters, at least 8 meters or at least 10 meters.

In case the submarine power cable comprises several stranded power cores and thus several conductor joints in the same region, the joint reinforcement armor surrounds all of the power cores and may extend at least 2 meters, such as at least 3 meters, at least 4 meters or at least 5 meters, in one axial directions from that conductor joint of the plurality of conductor joints which is arranged furthest in a first axial direction of the submarine power cable and at least 2 meters, such as at least 3 meters, at least 4 meters or at least 5 meters, in the other axial directions from that conductor joint of the plurality of conductor joints which is arranged furthest in a second axial direction of the submarine power cable. In this case, the joint region is hence centered on the range between the two conductor joints which are arranged axially furthest from each other.

The joint region has an axial extension or length which is a minority of the total length of the submarine power cable. In case of several joint regions, each joint region has an axial extension or length which is a minority of the total length of the submarine power cable.

According to one embodiment the joint reinforcement armor wires extend at most 1500 meters, such as at most 1000 meters, at most 500 meters, at most 300 meters, such as at most 200 meters, at most 100 meters, at most 50 meters, at most 40 meters, or at most 30 meters, in both axial directions from the conductor joint. Hereto, the joint region has a length of at most 3000 meters, such as at most 2000 meters, at most 1000 meters, at most 600 meters, such as at most 400 meters, at most 200 meters, at most 100 meters, at most 80 meters, or at most 60 meters. In case of several joint regions, each joint region may have a length of at most 3000 meters, such as at most 2000 meters, at most 1000 meters, at most 600 meters, such as at most 400 meters, at most 200 meters, at most 100 meters, at most 80 meters, or at most 60 meters. These lengths are still very short compared to the length of a submarine power cable which typically extends between 10-100 kilometers.

According to one embodiment the main armor wires are arranged helically around the power core and have a first lay direction.

According to one embodiment the joint reinforcement armor wires are arranged helically around the power core and have a second lay direction.

According to one embodiment the second lay direction is opposite to the first lay direction.

The lay length or pitch of the joint reinforcement armor wires are chosen to achieve an overall torsional stable cable. Hereto, the pitch of the joint reinforcement armor wires is selected based on the pitch of the main armor wires. The torsional forces of the two layers can thereby be counter-balanced or they can even cancel out. For a multi-core submarine power cable, the pitch of the reinforcement armor wires may further be based on the conductor cross-section, the elastic modulus of the conductors and the stranding pitch of the power cores. The pitch of the joint reinforcement armor wires may for example be the same as the pitch of the main armor wires, or it may be greater than the pitch of the main armor wires.

According to one embodiment at least some of the main armor wires comprise a metal such as steel, in particular galvanized steel or stainless steel, aluminum, or copper.

According to one embodiment at least some of the joint reinforcement armor wires comprise a metal such as steel, in particular galvanized steel or stainless steel, aluminum or copper.

According to one example, some of the main armor wires may be made of metal and some of the main armor wires may be made of a plastic material such as a polymer material. According to one example, some of the joint reinforcement armor wires may be made of metal and some of the joint reinforcement armor wires may be made of a plastic material such as a polymer material.

According to one embodiment each main armor wires is made of the same material along its length in the joint region.

According to one embodiment the power core has a plurality of additional joint regions each having a conductor joint, wherein each additional joint region has a respective additional joint reinforcement armor layer provided only in the corresponding additional joint region, each additional joint reinforcement armor layer comprising a plurality of joint reinforcement armor wires axially locked relative to the main armor wires, the additional joint reinforcement armor layers and the main armor layer thereby forming a dual-layer armor only in the additional joint regions.

According to one example, only those conductor joints which are to be installed deep sea, such as at about 150 to about maximum 250 meters water depth, have a joint region provided with a joint reinforcement armor layer. A length of the submarine power cable which is to be installed in more shallow waters, such as at about 70-120 meters water depth, may have conductor joints which have joint regions with only a single armor layer, namely the main armor layer.

The submarine power cable may be a DC power cable or an AC power cable. The submarine power cable may hence comprise one or more power cores.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
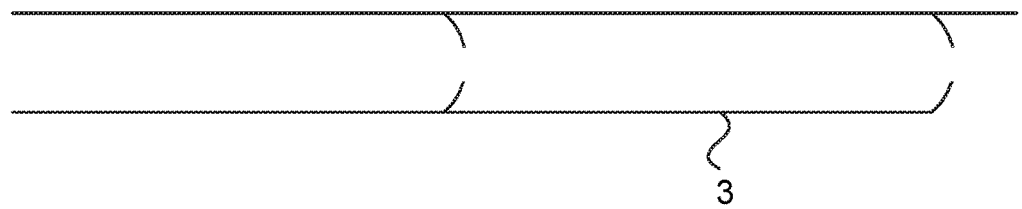
FIG. 1 schematically shows a side view of an example of a submarine power cable.

FIG. 1 schematically shows an example of a submarine power cable 1. The exemplified power cable is a DC cable but could alternatively be a multi-phase AC cable. The submarine power cable, whether DC or AC may be a medium voltage or high voltage cable. The submarine power cable 1 has an outer serving or outer sheath 3.

Figure 2:
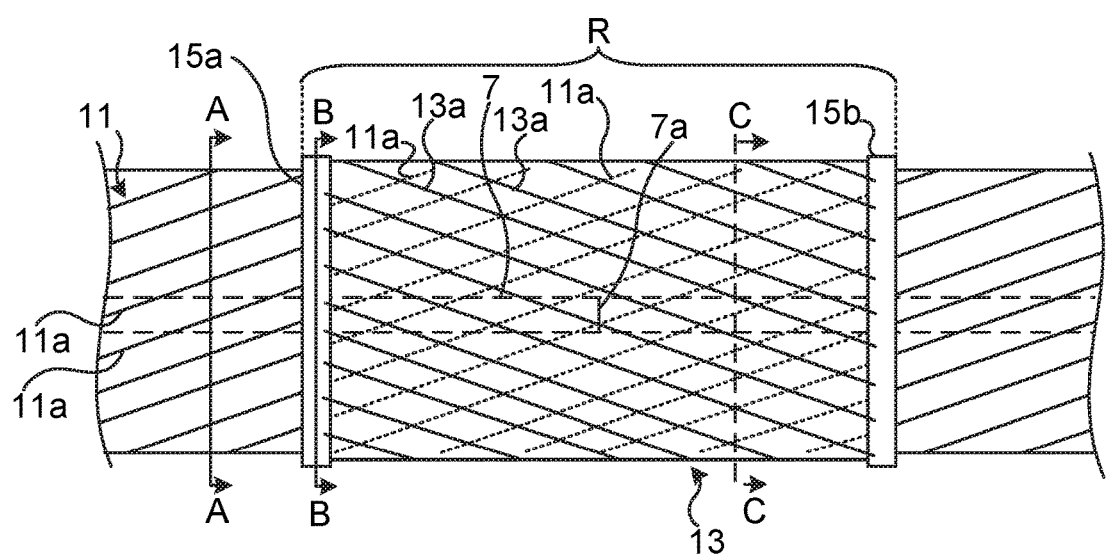
FIG. 2 schematically shows a side view of the submarine power cable in FIG. 1 with an outer serving or outer sheath removed.

FIG. 2 schematically shows the submarine power cable 1 with the outer serving or outer sheath 3 removed to expose internal components thereof. It is to be noted that in addition to the outermost layer, potentially present additional layers inside the outer serving or outer sheath 3 such as a corrosion protection layer, e.g. a bitumen layer, are also not shown. Furthermore, certain components radially inside of the outermost components have been made visible by means of dashed lines, as will be made clear in the following.

Figures 3A, 3B:
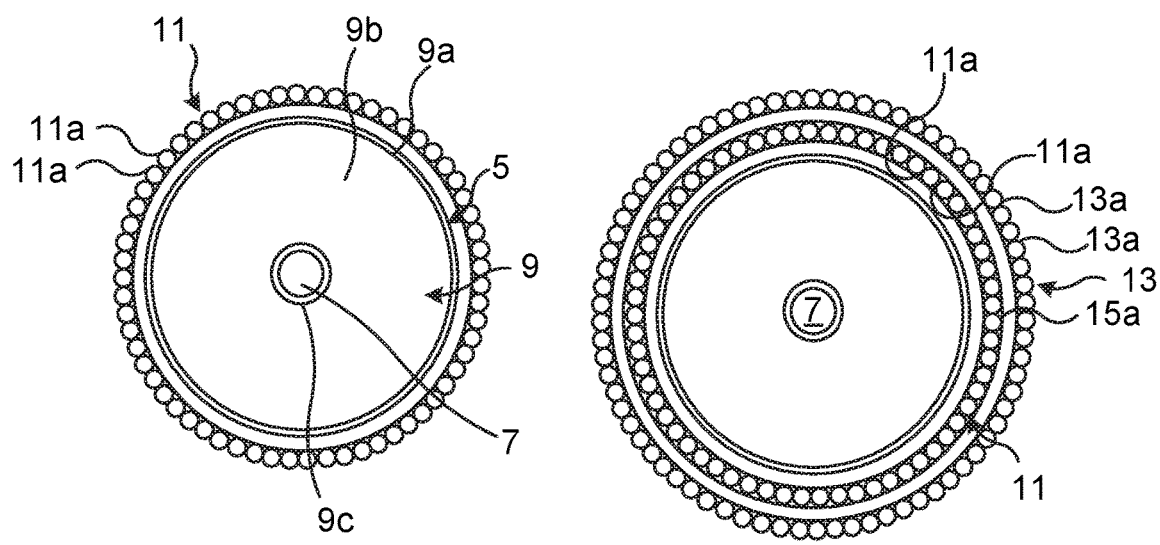
FIG. 3a schematically shows a cross-section of the submarine power cable in FIG. 2 along lines A-A.
FIG. 3b schematically shows a cross-section of the submarine power cable in FIG. 2 along lines B-B.

The submarine power cable 1 comprises a power core 5, as shown in FIG. 3a which is a cross-section along any of the two lines A-A in FIG. 2. The power core 5 comprises a conductor 7. The conductor 7 is made of metal such as copper or aluminum. The conductor 7 may for example be a solid conductor or a stranded conductor. In case that the conductor 7 is a stranded conductor, it may for example be a stranded round conductor, a segmental (Milliken) conductor, a compacted conductor or a profiled conductor. The conductor 7 is shown with dashed lines in FIG. 2 because other components are located radially outside of the conductor 7.

The conductor 7 is jointed. The conductor 7 hence has a conductor joint 7a. To this end, two conductor lengths/sections have been jointed during manufacturing to form a single conductor length/section having a conductor joint 7a. This may typically involve removing the end portions of the electrical insulation system of the respective power cable length, to expose an end portion of a respective conductor to be jointed. The electrical insulation system is restored after the conductors have been jointed. The thus formed cable joint may typically be a "factory joint" made in the factory, but could alternatively be a "flexible joint" which is made on-site during cable installation. The conductor joint 7a forms part of an axial section/length of the power core 5 which herein is referred to as a joint region R of the power core 5. The submarine power cable 1 may comprise one or a plurality of joint regions R, each having or containing a respective conductor joint 7a. In particular, any conductor joint 7a has a corresponding joint region R.

The power core 5 furthermore comprises an electrical insulation system 9 configured to electrically insulate the conductor 7. The electrical insulation system 9 is preferably a solid electrical insulation system. The electrical insulation system 9 may for example comprise an outer semiconducting layer 9a, a solid insulation layer 9b arranged radially inside of the outer semiconducting layer 9a, and an inner semiconducting layer 9c arranged radially inside of the solid insulation layer 9b. The outer semiconducting layer 9a and the inner semiconducting layer 9c may for example comprise a cross-linked polymer (such as, XLPE) mixed with a semiconducting powder, such as carbon black. The solid insulation layer 9b may for example comprise XLPE. The outer semiconducting layer 9a may be configured to be connected to electrical earth/ground. The submarine power cable 1 could alternatively to having the above-described XLPE-insulation structure for example be a mass-impregnated (MI) cable.

The submarine power cable 1 furthermore comprises a main armor layer 11. The main armor layer 11 is arranged radially outside of the power core 5. The main armor layer 11 comprises a plurality of main armor wires 11a. The main armor wires 11a are wound around the power core 5. The main armor wires 11a are helically wound around the power core 5. The main armor wires 11a may be wound with a main armor wire pitch. The main armor wire pitch is the length in which a main armoring wire 11a completes one turn around the power core 5. The main armor layer 11 extends in the axially direction along the power core 5. The main armor layer 11 extends along the majority of the length of the submarine power cable 1, for example along the entire length of the submarine power cable 1.

The main armor wires 11a are preferably made of metal, for example steel such as stainless steel or galvanized steel.

In examples in which the submarine power cable 1 is a multi-phase AC cable, the submarine power cable 1 comprises a plurality of power cores, which may be stranded. The main armor wires are in this case wound helically outside of the stranded power cores.

The submarine power cable 1 comprises a joint reinforcement armor layer 13 comprising a plurality of joint reinforcement armor wires 13a. The joint reinforcement armor layer 13 is only provided in the joint region R. The joint reinforcement armor wires 13a are layered with the main armor wires 11a in the joint region R. In the example in FIG. 2, the joint reinforcement armor wires 13a are arranged radially outside of the main armor wires 11a in the joint region R. The main armor wires 11a are therefore indicated with dashed lines in the joint region R. The submarine power cable 1 has only a single layer armor outside any joint region R formed by the main armor layer 11, and a double or dual-layer armor in any joint region R. The double layer armor is formed by the main armor wires 11a and the joint reinforcement armor wires 13a.

The joint reinforcement armor wires 13a are preferably made of the same material as the armor layer wires 11a. The joint reinforcement armor wires 13a are preferably made of metal, for example steel such as stainless steel or galvanized steel. According to one variation, some of the joint reinforcement armor wires 13a may be made of plastic such as a polymer material.

The joint reinforcement armor wires 13a are locked relative to the main armor wires 11a. The joint reinforcement armor wires 13a may be mechanically connected to the main armor wires 11a. The exemplified submarine power cable 1 comprises a first metal ring 15a, and a second metal ring 15b axially spaced apart from the first metal ring 15a. The first metal ring 15a is arranged at a distance from the conductor joint 7a in a first axial direction along the conductor 7. The second metal ring 15b is arranged at a distance from the conductor joint 7a in a second axial direction opposite to the first axial direction. The conductor joint 7a may for example be centered or essentially centered between the first metal ring 15a and the second metal ring 15b. The main armor wires 11a are connected to the first metal ring 15a and to the second metal ring 15a. The main armor wires 11a may be welded to the first metal ring 15a and to the second metal ring 15b. The first metal ring 15a and the second metal ring 15b may preferably be made of the same material as the main armor wires 11a. The first metal ring 15a is preferably made of steel e.g. stainless steel or galvanized steel, or aluminum. The second metal ring 15b is preferably made of steel e.g. stainless steel or galvanized steel, or aluminum.

Each joint reinforcement armor wire 13a has a first axial end portion and a second axial end portion opposite to the first axial end portion. The first axial end portion of each joint reinforcement armor wire 13a is directly connected to the first metal ring 15a and the second axial end portion of each joint reinforcement armor wire 13a is directly connected to the second metal ring 15b. The joint reinforcement armor wires 13a may for example be welded or soldered to the first metal ring 15a and to the second metal ring 15b. According to the example in FIG. 2, the first metal ring 15a and the second metal ring 15b are arranged radially outside of the main armor wires 11a. The first metal ring 15a may be made in a single piece or it may comprise several parts, e.g. two halves, in order to facilitate installation. The second metal ring 15b may be made in a single piece or it may comprise several parts, e.g. two halves, in order to facilitate installation. The joint reinforcement armor wires 13a are arranged radially outside of the main armor layer 11. The first metal ring 15a and the second metal ring 15b are hence arranged between the main armor layer 11 and the joint reinforcement armor layer 13. FIG. 3b, which depicts a cross-section of the submarine power cable 1 along lines B-B at the first metal ring 15a shows this configuration in more detail. The main armor layer 11 forms an inner armor layer and the joint reinforcement layer section 13 forms an outer layer with respect to the main armor layer 11 in the joint region R only. The joint region R is in this example defined by the axially extending region delimited by the first metal ring 15a and the second metal ring 15b. Outside of the joint region R, only the main armor layer 11 is provided around the power core 3.

Another alternative for locking the joint reinforcement armor layer axially relative to the main armor layer is for example that of only welding the joint reinforcement armor wires to the first metal ring and the second metal ring, and providing respective radial stop structures configured to prevent or restrict axial movement of the first metal ring and the second metal ring. Yet another alternative is to employ friction e.g. friction members configured to prevent axial displacement of the joint reinforcement armor layer relative to the main armor layer. Such friction members may for example be ropes and/or tapes arranged around the joint reinforcement armor layer and configured to apply a radially inwards directed force onto the joint reinforcement armor layer.

Figure 3C:
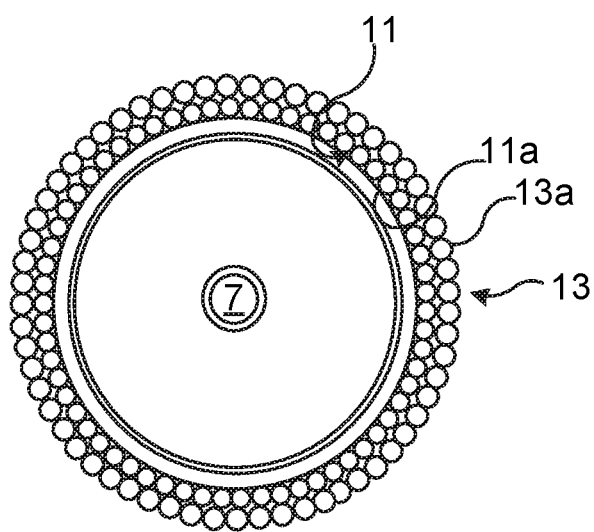
FIG. 3c schematically shows a cross-section of the submarine power cable in FIG. 2 along lines C-C.

FIG. 3c shows a cross-section of the submarine power cable 1 in the joint region R along lines C-C. The double or dual-layer armor can here be seen. The single layer armor is visible in FIG. 3a in cross-sections along lines A-A, outside of the joint region R.

The submarine power cable 1 may comprise a plurality of additional joint regions R. In this case, each additional joint region R preferably has the configuration described above, i.e. with an additional joint reinforcement armor layer layered with the main armor layer 11 present only in the additional joint regions.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A submarine power cable comprising:
a power core including a conductor, the power core having an electrical insulation system configured to electrically insulate the conductor, the electrical insulation system comprising an outer semiconducting layer, a solid insulation layer arranged radially inside the outer semiconducting layer, and an inner semiconducting layer arranged radially inside the solid insulation layer,
wherein the conductor has a conductor joint in a joint region of the power core,
a main armor layer including a plurality of main armor wires arranged around the power core and extending in the axial direction of the power core, and
a joint reinforcement armor layer including a plurality of joint reinforcement armor wires axially locked relative to the main armor wires, wherein the joint reinforcement armor layer is provided only in the joint region and arranged layered with the main armor layer, the joint reinforcement armor layer and the main armor layer thereby forming a dual-layer armor only in the joint region,
wherein the dual-layer armor is provided over and extends axially across the conductor joint,
wherein all the main armor wires are arranged helically around the power core across the joint region with a first lay direction, and all the joint reinforcement armor wires are arranged helically around the power core with a second lay direction opposite to the first lay direction.

2. The submarine power cable as claimed in claim 1, comprising a first metal ring arranged around the power core at an axial distance from the conductor joint in a first axial direction of the conductor, wherein a first axial end portion of each of the plurality of joint reinforcement armor wires, and the main armor wires are connected to the first metal ring.

3. The submarine power cable as claimed in claim 2, wherein the joint reinforcement armor wires and the main armor wires are welded to the first metal ring.

4. The submarine power cable as claimed in claim 3, comprising a second metal ring arranged around the power core at an axial distance from the conductor joint in a second axial direction of the conductor, the second axial direction being opposite to the first axial direction, wherein a second axial end portion of each of the plurality of joint reinforcement armor wires, and the main armor wires are connected to the second metal ring.

5. The submarine power cable as claimed in claim 2, comprising a second metal ring arranged around the power core at an axial distance from the conductor joint in a second axial direction of the conductor, the second axial direction being opposite to the first axial direction, wherein a second axial end portion of each of the plurality of joint reinforcement armor wires, and the main armor wires are connected to the second metal ring.

6. The submarine power cable as claimed in claim 5, wherein the joint reinforcement armor wires and the main armor wires are welded to the second metal ring.

7. The submarine power cable as claimed in claim 1, wherein the joint reinforcement armor wires are arranged radially outside of the main armor layer.

8. The submarine power cable as claimed in claim 1, wherein the joint reinforcement armor wires extend at least 2 meters in both axial directions from the conductor joint.

9. The submarine power cable as claimed in claim 1, wherein the joint reinforcement armor wires extend at most 1500 meters in both axial directions from the conductor joint.

10. The submarine power cable as claimed in claim 1, wherein at least some of the main armor wires include a metal.

11. The submarine power cable as claimed in claim 10, wherein at least some of the joint reinforcement armor wires include a metal of the same material as the main armor wires.

12. The submarine power cable as claimed in claim 1, wherein each main armor wire is made of the same material along a length in the joint region.

13. The submarine power cable as claimed in claim 1, wherein the power core has a plurality of additional joint regions each having a conductor joint, wherein each additional joint region has a respective additional joint reinforcement armor layer provided only in the corresponding additional joint region, each additional joint reinforcement armor layer having a plurality of joint reinforcement armor wires axially locked relative to the main armor wires, the additional joint reinforcement armor layers and the main armor layer thereby forming a dual-layer armor only in the respective additional joint regions.

14. The submarine power cable as claimed in claim 1, wherein the outer semiconducting layer is connected to ground.

* * * * *